United States Patent [19]

Braune et al.

[11] Patent Number: 4,820,060

[45] Date of Patent: Apr. 11, 1989

[54] SPACER BUSHING FOR TWO-ROW BALL BEARING

[75] Inventors: Gerhard Braune, Euerbach; Reinhard Hock, Dittelbrunn, both of Fed. Rep. of Germany

[73] Assignee: FAG Kugelfischer Georg Schafer (KGaA), Fed. Rep. of Germany

[21] Appl. No.: 218,664

[22] Filed: Jul. 13, 1988

[30] Foreign Application Priority Data

Aug. 11, 1987 [DE] Fed. Rep. of Germany ....... 3726629

[51] Int. Cl.$^4$ .............................................. F16C 23/10
[52] U.S. Cl. .................................. 384/447; 384/510; 384/512; 384/537; 384/551
[58] Field of Search .............. 384/447, 512, 551, 537, 384/510, 584, 585, 559

[56] References Cited

U.S. PATENT DOCUMENTS

| | | | |
|---|---|---|---|
| 709,441 | 9/1902 | Henderson | 384/551 |
| 3,467,450 | 9/1969 | Schmidt et al. | 384/447 |
| 4,606,658 | 8/1986 | Hofmann et al. | 384/512 |
| 4,615,627 | 10/1986 | Schilling et al. | 384/551 |

Primary Examiner—Lenard A. Footland
Attorney, Agent, or Firm—Ostrolenk, Faber, Gerb & Soffen

[57] ABSTRACT

A high precision, two-row ball bearing wherein the inner races of the two rows are worked into the shaft and there are respective outer rings around the rows of balls. A spacer bushing is axially disposed between the outer rings. The spacer bushing is of a single piece with an axial slot extending along its length. The slot has a width approximately equal to the diameter of the shaft. The center of the diameter of the bore of the spacer bushing is offset from the center point of the diameter of the external periphery of the spacer bushing, whereby the spacer bushing is radially thinnest opposite the axial slot and thickens toward the slot for balancing the mass of the spacer bushing with the material removed from the slot. A housing bushing surrounds the spacer bushing and the outer rings.

11 Claims, 1 Drawing Sheet

SPACER BUSHING FOR TWO-ROW BALL BEARING

BACKGROUND OF THE INVENTION

The present invention relates to a two-row ball bearing and particularly to a spacer bushing at the outer rings of the two-row bearing.

A ball bearing of this type is described in British Patent 542,669. It concerns a compact, easily mounted ball bearing in 0-arrangement. A spacer bushing, which is split into two half rings, is introduced between the outer rings of the two rows of the bearings.

Certain substantial disadvantages result from this special development of the spacer bushing. First, manufacture is made difficult by the existence of two bushing parts. A precision two-part spacer bushing can be manufactured only from two solid rings. Since each bearing consists of specially fitted parts, there is also a great danger that the half rings of the spacer bushing will be confused in their dimensions. In particular, they may have a different width or may have face angle errors with respect to the outer surface and the parting surface. This can lead to canting of the outer rings and thus to disturbances in the operation of the bearing. Normally, the outer rings of the bearing are introduced with a force fit into a surrounding bushing or housing. In this case, there is the danger that upon the use of a two-part spacer bushing between the bearing outer rings and inside the external, surrounding housing, when the bushing half rings are pushed into place, they may be displaced axially with respect to each other. This results in an oblique position of the bearing outer rings which are narrow relative to the outside diameter, with the danger of disturbance of the operation of the bearing. Subsequent correction is not possible since this condition cannot be recognized from the outside of the bearing external housing.

SUMMARY OF THE INVENTION

It is therefore the object of the present invention so to improve the above type of bearing that the above mentioned disadvantages do not occur.

Another object is to provide a simple, easily mounted bearing of maximum precision which does not produce any forces of imbalance, even upon high speeds of rotation of the outer rings.

The invention is used in a high precision, two-row ball bearing that operates at high rotation speeds. In the typical application of the invention, the inner races of both of the ball bearings are worked into the shaft on which the bearing is disposed, although that is not required for use of the invention. The outer races of the two ball bearings are axially spaced a distance apart. A spacer bushing is disposed between the two outer races. The invention concerns the particular construction of the spacer bushing. In contrast with the prior art, the spacer bushing of the invention is preferably a single piece. Along one external side of the bushing, there is an axial slot extending the length of the bushing and radially completely through the bushing, giving the bushing a generally C-shape. The slot has the width in the circumferential direction around the bushing of approximately the diameter of the shaft. This enables the single piece bushing to be disposed over the shaft by moving it radially over the shaft. Because a major portion of the spacer bushing has been removed, the bushing would normally be unbalanced. The invention is concerned with compensating for the missing part of the spacer bushing by appropriate profiling of the remainder of the bushing, which is now described below.

The spacer bushing between the outer ring is comprised of a single part. This enables relatively simple manufacture with high precision. The above mentioned danger of confusion of bushing ring parts is no longer present. For purposes of assembly, the spacer bushing is provided with an axial slot. The width of the slot is approximately equal to the diameter of the shaft. After the outer rings with the balls have been arranged on the shaft, the bushing can easily be subsequently inserted radially.

Under conditions which frequently occur in practice, with rotating outer rings, an imbalance would occur in the spacer bushing due to the slot in one side, when the exterior surface and inner bore surface are concentric. To avoid this, the center point of the diameter of the outer wall or exterior surface of the spacer bushing is offset in the radial direction away from the slot in that bushing with respect to the center point of the diameter of the bore of the spacer bushing. As a countermeasure against a material free space in the region of the slot, this produces in the circumferentially neighboring section of the bushing a large wall thickness of the spacer bushing. This wall thickness gradually decreases as the distance from the slot becomes greater. These conditions can be determined mathematically and can be so optimized that the center of gravity of the bushing falls on the axis of rotation of the bearing, which prevents an imbalance from occurring. In particular, the width of the spacer bushing can be manufactured very accurately. As a result, the outer rings can be introduced without axial tilting even when they are being pressed into a housing. The bearing therefore is of optimum precision and it can be used also when there are very high demands on the quality of travel and with high speeds of rotation.

It is also important that the bearing can be easily tested before its final installation. If necessary, in case of an unsatisfactory test run, defective parts can be replaced without the loss of good parts. Fastening in the surrounding external housing can then be effected, for example, by bonding or by a force fit.

Other objects and features of the invention are described with reference to the drawings.

DESCRIPTION OF A PREFERRED EMBODIMENT

Figure 1:
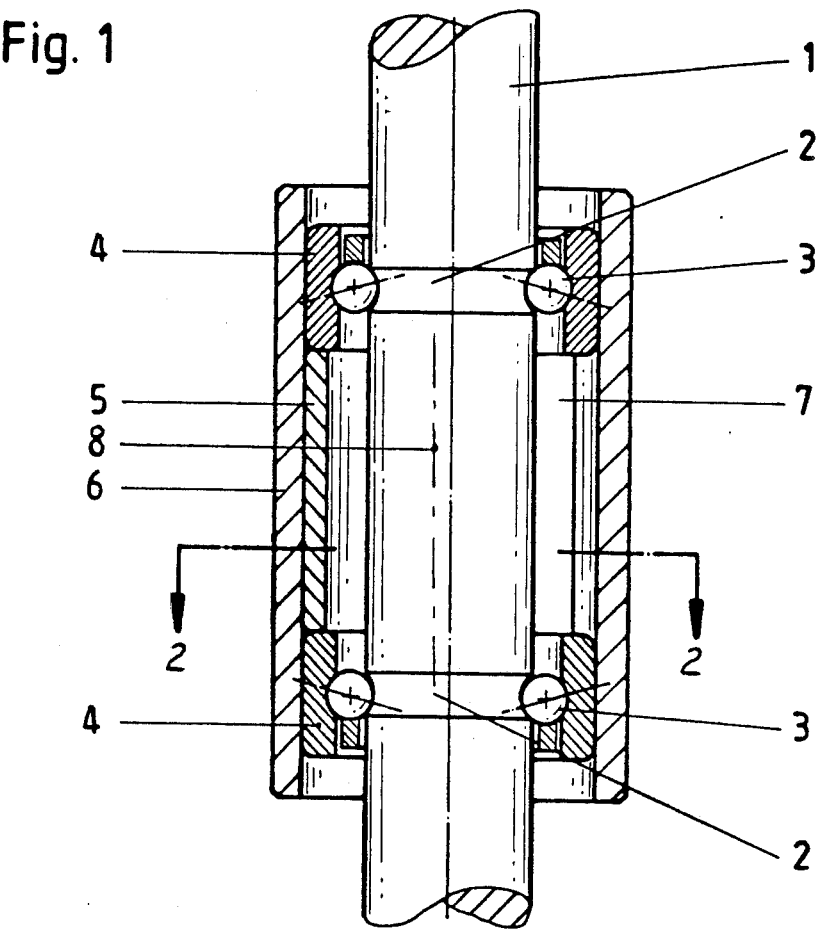
FIG. 1 is a longitudinal section through a ball bearing in accordance with the invention.

In FIG. 1, the ball bearing comprises the shaft 1 into which the inner races 2 of the two rows of bearing balls 3 are worked. The inner races could be on surfaces formed around the shaft. There is an outer ring 4 around each row of the balls. A spacer bushing 5 is disposed axially between the outer rings 4. In order to achieve a structural unit, the above indicated parts are arranged in an external housing bushing 6.

Figure 2:
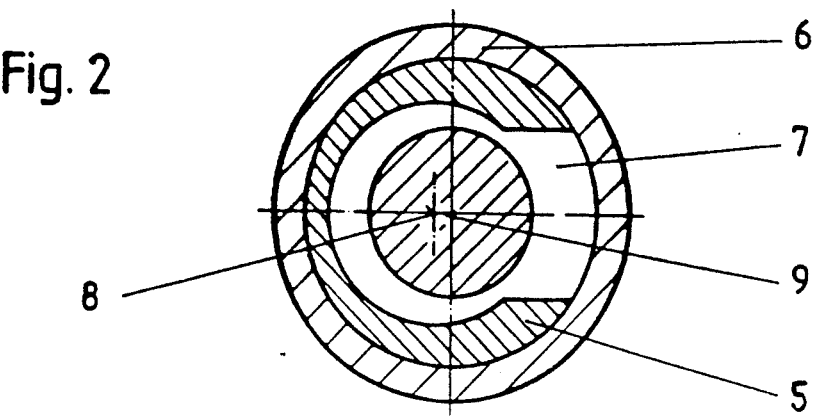
FIG. 2 is a cross-section through the bearing in the region of the spacer bushing.

The spacer bushing 5 is a simple, single piece. As shown in FIG. 2, that bushing has an axial slot 7 along its entire length and extending radially through the bushing. The width of the slot 7 corresponds approximately to the diameter of the shaft 1 so that, after the assembly of the two outer rings 4 and the rows of balls 5 with the shaft 1, the bushing can be easily inserted radially, around the shaft, as shown in FIG. 2, into the free space axially between the outer rings 4.

In order that no eccentric distribution of masses might occur in the installed condition of the bushing 5, the center point 8 of the diameter of the circular inner bore of the bushing around the shaft is offset in the radial direction opposite the slot 7 with respect to the center point 9 of the outside diameter of the outer surface of the bushing 5. In this way, there result different radial wall thicknesses of the bushing 5, with the wall thickness greatest adjacent the edges of the slot and gradually thinning toward the side of the bushing opposite the slot 7. By this means, the lack of mass within the slot 7 is compensated for. Even at high speeds of rotation, quiet, dependable running of the bearing is thereby assured.

The external peripheries at the outer surfaces of each of the outer rings and of the spacer bushing are of the same diameter, and the external housing bushing has approximately the same internal diameter for engaging the peripheries of the outer rings and the spacer bushing.

Although the present invention has been described in connection with a preferred embodiment thereof, many other variations and modifications will now become apparent to those skilled in the art. It is preferred, therefore, that the present invention be limited not by the specific disclosure herein, but only by the appended claims.

What is claimed is:

1. A two-row ball bearing comprising two inner races axially spaced apart, two outer rings radially spaced outwardly from and each extending around a respective inner race, and a respective row of bearing balls between each inner race and its respective outer ring;

a spacer bushing disposed in the axial space between the outer rings and of a length for engaging the outer rings; the spacer bushing having a circular bore defined in it and having an outer surface around it; the spacer bushing having an axial slot extending along its length and radially through the spacer bushing; the axial slot being of a width that is large enough that the spacer bushing may be moved in the direction radially of the two outer rings past an object on which the inner races are supported and to the position axially between the outer rings;

the bore in the bushing being eccentric of the spacer bushing in a direction away from the slot in the bushing and offset with respect to the center of the diameter of the outer surface of the spacer bushing.

2. The bearing of claim 1, wherein the spacer bushing is a single piece.

3. The bearing of claim 2, wherein the radial thickness of the spacer bushing varies gradually from thinnest diametrically opposite the arcuate center of the slot to thickest at the sides of the slot.

4. The bearing of claim 1, wherein the spacer bushing is radially thinner diametrically opposite the slot and is radially thicker at the slot.

5. The bearing of claim 1, wherein the bearing inner races are disposed on a shaft.

6. The bearing of claim 5, wherein the inner races of the rows of balls are worked into and defined in the shaft.

7. The bearing of claim 5, wherein the width of the slot is approximately equal to the diameter of the shaft.

8. The bearing of claim 5, wherein the spacer bushing is a single piece.

9. The bearing of claim 1, wherein the outer rings and the spacer bushing have respective external peripheries;

a housing bushing, the outer rings and the spacer bushing being disposed inside the housing bushing, the housing bushing having an internal bore that is sized to engage the external peripheries of the outer rings and of the spacer bushing.

10. The bearing of claim 9, wherein the outer rings and the spacer bushing have the same external diameters of their peripheries.

11. The bearing of claim 1, wherein the axial slot has a circumferential width and the diameter along which the center point of the bore of the spacer bushing is offset is a diameter through the center of the width of the slot.

* * * * *